(12) United States Patent
Parekh et al.

(10) Patent No.: US 6,447,684 B2
(45) Date of Patent: Sep. 10, 2002

(54) FILTRATION AND PURIFICATION SYSTEM FOR PH NEUTRAL SOLUTIONS

(75) Inventors: Bipin S. Parekh, Chelmsford; Anthony J. DiLeo, Westford, both of MA (US); Edward Deane, Newton Junction, NH (US); Ronald L. Bruening, Springville, UT (US)

(73) Assignees: Mykrolis Corporation, Billerica, MA (US); IBC Advanced Technologies, Inc., American Fork, UT (US)

( * ) Notice: Subject to any disclaimer, the term of this patent is extended or adjusted under 35 U.S.C. 154(b) by 0 days.

(21) Appl. No.: 09/855,311

(22) Filed: May 14, 2001

Related U.S. Application Data

(63) Continuation of application No. 09/382,748, filed on Aug. 25, 1999, now abandoned.

(51) Int. Cl.[7] .......................... B01D 61/14; B01D 63/14
(52) U.S. Cl. .............. 210/638; 210/195.2; 210/321.86; 210/500.29; 210/500.38; 210/651; 210/900
(58) Field of Search ................ 210/490, 493.1, 210/493.5, 500.29, 500.37, 500.38, 502.1, 634, 638, 650, 651, 653, 654, 683, 684, 688, 195.2, 500.3, 900, 321.86; 118/429; 502/401, 402

(56) References Cited

U.S. PATENT DOCUMENTS

| | | | |
|---|---|---|---|
| 4,618,553 A | * | 10/1986 | Steuk |
| 4,693,985 A | * | 9/1987 | Degen et al. ............. 210/493.1 |
| 4,851,011 A | * | 7/1989 | Lacroix et al. |
| 4,886,604 A | * | 12/1989 | Sleytr et al. ................. 210/653 |
| 4,943,375 A | * | 7/1990 | Bradshaw et al. |
| 4,952,321 A | * | 8/1990 | Bradshaw et al. |
| 4,952,386 A | * | 8/1990 | Davison et al. |
| 4,959,153 A | * | 9/1990 | Bradshaw et al. |
| 4,960,822 A | * | 10/1990 | Eichenauer et al. |
| 5,039,419 A | * | 8/1991 | Bradshaw et al. |
| 5,071,819 A | * | 12/1991 | Tarbet et al. |
| 5,078,978 A | * | 1/1992 | Tarbet et al. |
| 5,084,430 A | * | 1/1992 | Tarbet et al. |
| 5,087,372 A | * | 2/1992 | Toyomoto et al. |
| 5,152,901 A | * | 10/1992 | Hodgdon ..................... 210/654 |
| 5,173,470 A | * | 12/1992 | Breuning et al. |
| 5,175,110 A | * | 12/1992 | Bradshaw et al. |
| 5,179,213 A | * | 1/1993 | Bradshaw et al. |
| 5,182,251 A | * | 1/1993 | Breuning et al. |
| 5,190,661 A | * | 3/1993 | Breuning et al. |
| 5,224,856 A | * | 7/1993 | Nakamura |
| 5,244,856 A | * | 9/1993 | Breuning et al. |
| 5,266,207 A | * | 11/1993 | Boye et al. .................. 210/653 |
| 5,273,660 A | * | 12/1993 | Breuning et al. |
| 5,393,892 A | * | 2/1995 | Krakowiak et al. |
| 5,531,899 A | * | 7/1996 | Yen et al. |
| 5,547,760 A | * | 8/1996 | Tarbet et al. |
| 5,618,433 A | * | 4/1997 | Tarbet et al. |
| 5,645,727 A | * | 7/1997 | Bhave et al. ................ 210/900 |
| 5,980,759 A | * | 11/1999 | Prouxl et al. |
| 5,988,400 A | * | 11/1999 | Karachevtcev et al. .. 210/493.1 |

FOREIGN PATENT DOCUMENTS

JP 07 024314 * 1/1995

OTHER PUBLICATIONS

Parekh, B. et al., "Performance of a POU Purifier in Ionic Contamination Removal," Solid State Technology, pp. 77–84 (Aug. 1996).*

* cited by examiner

*Primary Examiner*—Joseph W. Drodge
(74) *Attorney, Agent, or Firm*—Hamilton, Brook, Smith & Reynolds, P.C.

(57) ABSTRACT

The invention pertains to a method for simultaneously removing metallic ions and particulate material from a pH neutral solution using particle-removing membranes (e.g., ultra high molecular weight polyethylene) having immobilized ligands that possess the capacity and high equilibrium binding constants for ion removal. The method is particularly useful for simultaneously filtering/purifying deionized water.

23 Claims, 2 Drawing Sheets

Dissolved Ions Purification System (POU)

Dissolved Ions Purification System (POU)

FILTRATION AND PURIFICATION SYSTEM FOR PH NEUTRAL SOLUTIONS

RELATED APPLICATION

This application is a continuation of U.S. application Ser. No. 09/382,748 filed Aug. 25, 1999, now abandoned the entire teachings of which are incorporated herein by reference.

BACKGROUND OF THE INVENTION

Liquids, such as aqueous and organic liquids, are purified to remove unwanted ions by passing the liquid through a packed column of ion exchange resin beads. In order to improve efficiency of ion removal and rate of processing the liquid, small particle size ion exchange resin beads and high flow rates are desirable. While smaller particle size resin beads improve efficiency in a packed column, they also effect a decrease in the fluid flow rate which, in turn, renders the optimization of the purification process utilizing the beads difficult. A common undesirable phenomenon when using a packed column of beads is the phenomenon of channeling wherein the liquid being purified passes only through a portion of the bed while rendering the remainder of the bed underutilized.

A significant problem associated with incorporating ion exchange resin particles into a polymer matrix is that the resin particles are swellable in aqueous liquids. Thus, when a composite material comprising a polymer binder and the ion exchange resin particles is contacted with water, in the case of a porous membrane composite, the porosity of the composite is significantly reduced thereby significantly reducing the flow rate of the liquid through the porous composite.

Ultrahigh molecular weight polyethylene is a desirable material since it exhibits good chemical resistance to a wide variety of reagents and therefore provides wide flexibility as a material for uses in processes involving contact with these reagents such as in purification processes.

Accordingly, it would be desirable to provide membranes having ion removal capacity which have high ion capture (efficiency) characteristics, have a high ion removal capacity per unit area and permit maintenance of desirable flow rate per unit area through the membrane when it is wet in aqueous solution. In addition, it would be desirable to provide such membranes which are useful in efficiently processing high volumes of pH neutral liquid.

SUMMARY OF THE INVENTION

This invention pertains to a method for removing selected ions (e.g., metallic ions) and particulate material from pH neutral aqueous and organic solutions using particle-removing membranes (e.g., ultra high molecular weight polyethylene) having immobilized ligand groups that possess the capacity and high equilibrium binding constants for ion removal. The method is particularly useful for simultaneously filtering/purifying deionized (DI) water.

According to the method of the invention, metallic ions and particulate material are simultaneously removed from a pH neutral aqueous solution by contacting the aqueous solution, which is contaminated with metallic ions and particulate material, with a composition suitable for removing metallic ions and particulate material contained in said solution, then recovering a purified and filtered solution essentially depleted of metallic ions and particulate material. Compositions useful for purifying and filtering comprise an ion-binding ligand bound to a membrane, having an affinity for metallic ions and having an ability to remove particulate material contained in said solution. The membrane ligand combination is represented by the formula:

$$M\text{-}B\text{-}L$$

wherein M is a membrane or composite membrane derivatized to have a hydrophilic surface and containing polar functional groups; L is a ligand (e.g., macrocycle or other similar chelating ligand) having an affinity for metallic ions and containing a functional group reactive with an activated polar group from the membrane; and B is the covalent linkage formed by the reaction between the activated polar group and the functional group of the ligand. In a preferred embodiment, the membrane will comprise a plurality of different ligands that are ion specific. In another embodiment, M is capable of removing particulate material contained in the solution.

The filtration/purification methods of this invention have several advantages. The fluid to be processed can flow through a membrane structure and react with the ligand that is immobilized on the membrane inner surface with very small mass transfer resistance. This allows the fluid to be processed through membranes at relatively high throughputs with no loss in ligand-ion complexing efficiency. The particle retention properties of membranes have been combined with ligand technology in one system to remove both ions and particles from fluids.

The invention further pertains to filtration/purification devices comprising membranes or composite membranes with immobilized ligand groups. The ligand immobilized membranes have been fabricated into devices that enable high flow rates and low pressure drops. These engineering requirements may not as easily be met with bead technology.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
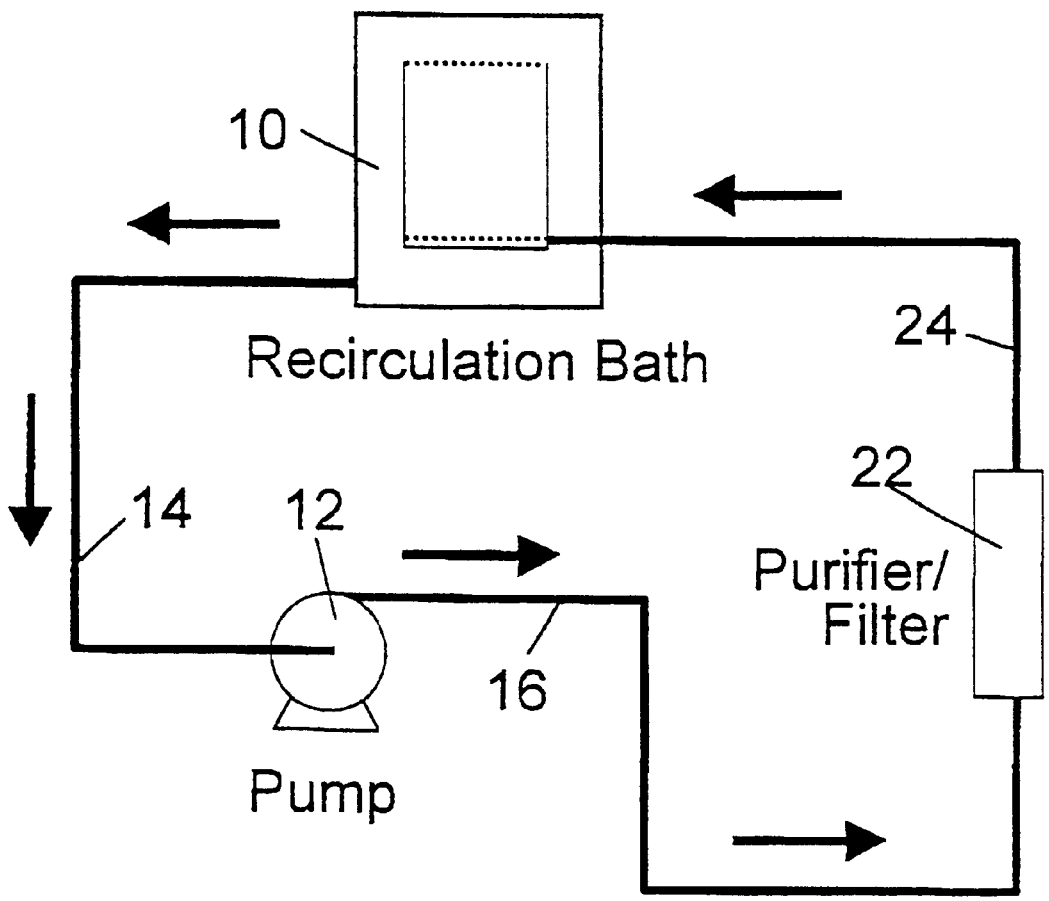
FIG. 1 is a schematic view of a process for filtering/purifying a pH neutral aqueous solution utilizing the membrane of this invention.

The invention pertains to methods and devices for removing metallic ions and particulate material from a pH neutral aqueous solution such as, but not limited to, deionized water and buffered aqueous solutions. The method uniquely purifies and filters out metallic ions and particulates from pH neutral aqueous solutions by using a combination of ligands that have an affinity for metallic ions of interest and membranes that are capable of filtering out particulate material present in the pH neutral aqueous solution. These impurities can be simultaneously removed using membranes or composite membranes (i.e., surface modified) having ion-binding ligands immobilized thereon. The ligands possess ion complexing capacity and high equilibrium binding constants for ion removal. Metal recovery from aqueous and organic waste solutions, represent a real need in modern technology. Metal ions and particulate material are typically present at low concentrations in solutions. Hence, there is a real need for a process to efficiently purify and filter pH neutral aqueous solutions for their reuse or disposal. The present invention accomplishes this separation effectively and efficiently by the use of ligands bonded to membranes in accordance with the present invention. It has been found that the membranes of this invention are capable of rapidly and essentially completely removing metals and particulates from pH neutral solutions to specification levels of about 10 to 50 parts per trillion (ppt). The term "pH neutral solutions" as used herein is intended to embrace water (e.g., deionized water; (DI) and DI water containing very low (ppb) concentrations of NaCl), buffered aqueous solutions, having a pH range of from about 6 to about 8, with pH about 6.5 to about 7.5 being preferred.

It should be understood from the discussion herein that the membrane can be used to simultaneously remove metallic ions and particulate material. However, it is not essential that both events occur. For example, a membrane can be chosen such that the pore size is sufficiently large to allow particulates to flow through. Thus, it is contemplated that the ion-binding ligand membrane and devices can be used to remove metallic ions, or to remove both metallic ions and particulates.

The methods of this invention can be used in a variety of industrial applications including, but are not limited to, analytical, catalysis, chemical and petrochemical, environmental, food and beverages, metallurgical processes, microelectronics, pharmaceutical/life science, and power generation. Many of these industrial applications contaminate pH neutral solutions with metallic ions, such as heavy metals, and particulates. In fresh aqueous solutions the sources of particles and ions can come from manufacturing equipment, processes, raw materials and containers. During use the contaminants are added from plumbing and the wafer cleaning operations. The particles are usually submicron colloidal types. Use of the invention can eliminate or reduce environmental considerations associated with disposal of contaminated waste waters.

The general method for simultaneously removing metallic ions and particulate material from pH neutral aqueous solutions comprises contacting the aqueous solution, which is contaminated with metallic ions and particulate material, with a composition suitable for simultaneously removing metallic ions and particulate material contained in said solution, then recovering a purified and filtered solution essentially depleted of metallic ions and particulate material. Compositions useful for purifying and filtering comprise an ion-binding membrane ligand combination represented by the formula:

M-B-L wherein M is any membrane or composite membrane derivatized to have a hydrophilic surface and containing polar functional groups, wherein M is capable of removing particulate material contained in said solution; L is a ligand having an affinity for metallic ions and containing a functional group reactive with an activated polar group from the membrane; and B is a covalent linkage formed by the reaction between the activated polar group and the functional group of the ligand. Representative B linkages are selected from the group consisting of amide (NHCO), ester (COO), thioester (COS), carbonyl (CO), ether (O), thioether (S), sulfonate ($SO_3$) and sulfonamide ($SO_2NH$).

In a preferred embodiment, the membrane will comprise a plurality of different ligands that are ion specific. The exact ligands chosen and the ratio of ion specific ligands relative to each other will depend upon the ions to be removed from the pH neutral aqueous solution and the desired lifetime of the filtration/purification lifetime. For new neutral water applications the only requirement for proper ion removal is a ligand with an interaction constant high enough to remove the ion efficiently to the desired level. For instance, low ppb and low ppt levels for most ions are equivalent to $10^{-10}$ to $10^{-8}$ and $10^{-9}$ to $10^{-11}$ Molar, respectively. Hence, an effective interaction constant of $\geq 10^6$–$10^8$ and preferably $\geq 10^9$ to $10^{11}$ is sufficient to perform the removal to ppt or sub ppb levels, with at least significant and preferably near quantitative use of the ligand capacity, along with rapid kinetics of interaction to deal with the low levels involved. The Table is exemplary of accomplishing the goal. The specific removal of target ions by a ligand is unaffected by other ligands. Ion removal is stoichiometric.

The composite membranes with immobilized ligand groups are particularly useful for removing trace metal ions from high purity water. The water to be purified flows through the membrane structure and the trace metals react with the ligand (immobilized on the membrane inner surface) at high mass transfer rates. Therefore, the fluid can be processed through the membranes at relatively high throughputs with no loss in ligand-ion complexing efficiency. The residence time of water through the membrane is of the order of a fraction of a second, far less than minutes required for the ion exchange column operation. The ligand immobilized membranes have been fabricated into devices that enable high flow rates and low pressure drops. These engineering requirements are not easily met with ion exchange bead technology. The particle retention properties of membranes have been combined with ligand technology in one system to remove both ions and particles from water and other pH neutral solutions.

To achieve the removal of multiple ions from DI water, several ligands are immobilized onto one membrane/device. Each ligand is designed to remove a specific class of ions. For the DI water purification, ligands SL 420, SL 415 and SL 407 (commercially available from IBC, Advanced Technologies, Inc., American Fork, Utah) are immobilized on the same membrane device to remove ions listed in the following Table. As shown in the Table, these ligands have binding constants that are suitable for removing ions to ppt levels.

TABLE

LogK Values for DI Water Purifier Ligands

| Element | LogK | Ligand |
|---------|------|--------|
| $Cu^{++}$ | 16 | SL 420[1] |
| $Ni^{++}$ | 13.5 | SL 420[1] |
| $Zn^{++}$ | 9.5 | SL 420[1] |
| $Co^{++}$ | 11 | SL 420[1] |
| $Fe^{++}$ | 8 | SL 420[1] |
| $Ag^{++}$ | 6.5 | SL 420[1] |
| $Mn^{++}$ | 6 | SL 415[2] |
| $Fe^{+++}$ | 18 | SL 415[2] |
| $Al^{+++}$ | 16 | SL 415[2] |
| $Ca^{++}$ | 7 | SL 407[3] |

TABLE-continued

LogK Values for DI Water Purifier Ligands

| Element | LogK | Ligand |
| --- | --- | --- |
| Na$^+$ | 5.5 | SL 407[3] |
| Pb | >8 | SL 437[4] |

[1]U.S. patent application No. 09/202,731
[2]U.S. Pat. No. 5,182,251
[3]U.S. Pat. Nos. 4,943,375 (particles), 5,547,760 (membrane) and 4,960,882
[4]U.S. Pat. No. 5,393,892

According to the methods of the invention, high purity water is contacted with a microporous ligand membrane device to effect simultaneous removal of metal ions (such as those provided in the Table above) and particulates. The purified water is recovered or recycled for further use, such as for cleaning/rinsing silicon wafers following the chemical wet etch processes, or for any other process where it is desirable to have highly purified water or aqueous solutions. The purified DI water can be monitored continuously or periodically for the presence of undesired metal ions to determine if the membrane device should be replaced. The purifier can be used in a recirculation system shown in FIG. 1 or in a once-through (one pass) flow configuration in which the water continuously flows through the device and purified. As shown in FIG. 1, container 10 contains DI water and silicon wafers. The water is pumped by means of pump 12 through conduits 14 and 16 into contact with the membrane purifier/filter 22, which functions to remove ions and particles in the water. The purified water then is recycled through conduit 24 back to container 10 (40 liters size) for reuse. The water is continuously recirculated through the purifier until bath concentration reaches low equilibrium ion levels. In this flow mode, the solution has many chances to pass through the purifier and be purified.

In a once-through (one pass) flow mode, the water flows through the purifier continuously. The ions and particles are removed by the ligand device. The purified water is then directed to the rinsing and cleaning equipment. In this application, the water has only one chance to interact with the ligands on the membrane, thus the removal of ions must occur to equilibrium levels instantaneously as the residence time in the membrane is less than one second. The high inner surface area of the ligand membranes provides greater access to ions for binding to the ligand sites. The high binding constants create stronger interactions between ions and ligands that allow ions removal to ppt levels in one pass through the purifier.

The filtration/purification process of the invention can be carried out in any manner that provides for bringing the ions and particulate material to be removed from the pH neutral solution into contact with the ligands affixed to the membrane. The preferred embodiment disclosed herein involves carrying out the process by bringing the pH neutral solution into contact with a composition of matter of the invention. Contact is preferably made in a contacting device comprising a housing, such as a cartridge, containing the composition of matter of the invention by causing the pH neutral solution to flow through the housing (e.g., cartridge) and thus come in contact with the composition of the invention. The contacting device can include means for flowing a source solution and a receiving solution past said ligand-membrane composition. Preferably, the membrane configuration is a pleated membrane, although other membrane configurations, such as flat sheet, stacked disk or hollow fibers may be used. However, various contact apparatus may be used instead of cartridges. The selected ion or ions complex with the composition and the filtered and purified pH neutral solution can be reused.

An advantage of the ligand membrane and cartridges containing the same is that they can be regenerated by removal of bound ions from the ligand. A cleaning method has been developed to remove all contaminants from the device so it would not contribute any significant extractables to the processing fluids. Effective cleaning is a key factor responsible for the superior performance of the ligand/membrane device, especially for applications that require sub-ppb level of cleanliness. This can be accomplished by contacting the membrane with an acid solution (e.g., from about 6M to about 12M hydrochloric acid) under conditions sufficient to remove the ions from the membrane. The ions can be collected and recovered using known techniques. Preferably, the cleaning chemical should be extremely clean (sub-ppb impurity) and should be strong enough to remove all metals bound to the ligand. For example, Megabit grade HCl (from about 6M to about 12M ) is preferred (Ashland Chemical Co., Columbus, Ohio).

Compositions useful in the present invention comprise ion-binding ligands that are covalently bonded to a membrane through an amide, ester, thioester, carbonyl or other suitable bond and have been described in detail in U.S. Pat. Nos. 5,547,760, 5,618,433 and U.S. Ser. No. 08/745,026; the entire teachings of which are incorporated herein by reference. Membranes that are inherently hydrophilic, or partially hydrophilic, and contain moieties appropriate for making these bonds are preferred. Such membranes include polyamides, such as nylon, and cellulosic materials, such as cellulose, regenerated cellulose, cellulose acetate, and nitrocellulose. If the membrane used does not contain reactive groups it may be modified or derivatized appropriately. Composite membranes are also useful. A composite membrane comprises a porous polymer membrane substrate and an insoluble, cross-linked coating deposited thereon. Representative suitable polymers forming the membrane substrate include fluorinated polymers including poly (tetrafluoroethylene) ("TEFLON"), polyvinylidene fluoride (PVDF), and the like; polyolefins such as polyethylene, ultra-high molecular weight polyethylene (UPE), polypropylene, polymethylpentene, and the like; polystyrene or substituted polystyrenes; polysulfones such as polysulfone, polyethersulfone, and the like; polyesters including polyethylene terephthalate, polybutylene terephthalate, and the like; polyacrylates and polycarbonates; polyethers such as perfluorinated polyethers; and vinyl polymers such as polyvinyl chloride and polyacrylonitriles. Copolymers can also be used for forming the polymer membrane substrate, such as copolymers of butadiene and styrene, fluorinated ethylene-propylene copolymer, ethylene-chlorotrifluoroethylene copolymer, and the like. The preferred membrane is hydrophilic ultrahigh molecular weight polyethylene containing carboxylic groups, such as those described in U.S. Pat. Nos. 4,618,533, 5,618,433 and 5,547,760.

With composite membranes, the substrate membrane material is not thought to affect that performance of the derivatized membrane and it is limited in composition only by its ability to be coated, or have deposited on its surface, an insoluble polymer layer that contains the appropriate reactive group. This provides a hydrophilic layer which interacts well with water or other aqueous solutions. The end result is that when the ligand is attached to the surface of either a hydrophilic membrane or a composite membrane having a hydrophilic surface, the basic characteristics of any given ligand molecule are not changed by the process of attaching it to the surface or by the nature of the surface itself.

The coating of the composite membrane comprises a polymerized cross-linked monomer, such as acrylates, methacrylates, ethacrylates, acrylic acid, acrylamides, methacrylamides, ethacrylamides and mixtures thereof. Representative suitable polymerizable monomers include hydroxyalkyl acrylates or methacrylates including 1-hydroxyprop-2-yl acrylate and 2-hydroxyprop-1-yl acrylate, hydroxypropylmethacrylate, 2,3-dihydroxypropyl acrylate, hydroxyethylacrylate, hydroxyethyl methacrylate, and the like, and mixtures thereof. Other polymerizable monomers that can be utilized include acrylic acid, 2-N,N-dimethylaminoethyl methacrylate, sulfoethylmethacrylate and the like, acrylamides, methacrylamides, ethacrylamides, and the like. Other types of hydrophilic coatings that can be used within the scope of the invention include epoxy functional groups such as glycidyl acrylate and methacrylate, primary amines such as aminoethyl methacrylates, and benzyl derivatives such as vinyl benzyl chloride, vinyl benzyl amine, and p-hydroxyvinyl benzene.

The basic consideration in selecting a composite membrane is that the coating placed on the membrane substrate is the determining factor in defining the chemistry used to covalently attach the ligand. For example, a composite membrane displaying a carboxylic acid functional group can form an amide bond with a pendant amine group from the ligand, one of the most stable methods of ligand immobilization. The composite polymers referenced above can be prepared with carboxylic acid active groups that can be readily converted to amides upon reaction with an amine group on a ligand. However, any of the other organic species which are reactive toward an acid chloride could be used to attach an organic ligand to the surface. Additional examples of such groups would be esters, thioesters, Grignard reagents, and the like. If the reactive group on the surface is a sulfonic acid, then an analogous procedure using a sulfonyl chloride would yield results similar to those obtained with carboxylic acid functionalities. One such polymer containing sulfonic acid reactive groups is available under the tradename NAFION® from DuPont as described above. Preferably, suitable ligands contain an ester or carboxyl group and an amine to form an amide linkage.

The composite membrane comprises a membrane substrate formed of a first polymer and having coated thereon a second polymer having a hydrophilic surface. The second polymer can be coated onto the first polymer by a precipitated crystal technique. Alternatively, the surface of the first polymer is coated with a cross-linked second polymer formed from a monomer polymerized in situ and cross-linked in situ on the substrate. In one embodiment, the coating of composite membranes also comprises a precipitated crystal system, such as that involving the material known under the trademark NAFION®. NAFION® is a sulfonic acid or sodium sulfonate of a perfluorinated polyether. In another embodiment, the preferred coating is commercially available as ETCHGUARD® (Millipore Corporation); U.S. Pat. No. 4,618,533.

Ligands which may be adapted to contain —$NH_2$, —OH, —SH, —MgX moieties that are reactive so as to form a covalent bond with membrane attached functionalities are described in U.S. Pat. Nos. 5,618,433, 5,547,760 and 5,078,978. The ligand can be selected from the group consisting of amine-containing hydrocarbons (e.g., U.S. Pat. No. 4,952,321), sulfur and nitrogen-containing hydrocarbons (e.g., U.S. Pat. Nos. 5,071,819 and 5,084,430), sulfur-containing hydrocarbons (e.g., U.S. Pat. Nos. 4,959,153 and 5,039,419), crowns and cryptands (e.g., U.S. Pat. Nos. 4,943,375 and 5,179,213), aminoalkylphosphoric acid-containing hydrocarbons (e.g., U.S. Pat. No. 5,182,251), polyalkylene-polyamine-polycarboxylic acid-containing hydrocarbons, proton-ionizable macrocycles (e.g., U.S. Pat. No. 4,960,882), pyridine-containing hydrocarbons (e.g., U.S. Pat. No. 5,078,978), polyetraalkylammonium and polytrialkylamine-containing hydrocarbons (e.g., U.S. Pat. No. 5,244,856), thiol and/or thioetheraralkyl nitrogen-containing hydrocarbons (e.g., U.S. Pat. No. 5,173,470), sulfur and electron withdrawing groups containing hydrocarbons (e.g., U.S. Pat. No. 5,190,661), hydroxypyridinone, hydroxypyridinone on a polyamine or other carrier (e.g., U.S. Ser. No. 09/330,543), and macrocyclic polyether cryptands. The ligands are capable of selectively complexing ions such as either certain alkali, alkaline earth, noble metal, other transition metal, and post transition metal ions when contacted with solutions thereof when admixed with other ions. Examples of ligands that can be used for the above-identified application have been previously described in U.S. Pat. No. 5,618,433 and in U.S. application Ser. Nos. 09/330,543 and 09/330,477, entitled "Polymeric Membranes Functionalized with Polyhydroxypyridinone Ligands" and "Particulate Solid Supports Functionalized with Polyhydroxypyridinone Ligands", respectively, both filed on Jun. 11, 1999, for removal of iron (SuperLig 435®; IBC Corp.); entire teachings are incorporated herein by reference, such as U.S. application Ser. No. 09/202,731 for removal of copper (SuperLig 420®; IBC Corp.); SuperLig 415® for Mn(II), Fe(III) and Al(III); SuperLig 40® for removal of calcium and sodium, both described in U.S. Pat. Nos. 4,943,375 and 5,547,760; and SuperLig 437® for lead removal described in U.S. Pat. No. 5,393,892 (See Table above.).

The compositions of the present invention may be prepared by any suitable method wherein the macrocycle ligands can be covalently bonded to a membrane containing reactive functional groups. See U.S. Pat. No. 5,618,433, issued Apr. 8, 1997, the entire teachings of which are incorporated herein by reference. For example, immobilization of the ligand onto the membrane is carried out in a two step procedure: [1] activation and [2] coupling. The activation procedure involves reaction of carboxylic acid groups on membranes with 1-Ethyl-3-(3-Dimethylaminopropyl) carbodiimide Hydrochloride (EDAC) in either water or IPA/water medium to produce a reactive intermediate compound. In the coupling step this reactive intermediate compound reacts with the amine group on the linker arm attached to the ligand, producing the ligand immobilized membrane surface. The immobilization procedure can be carried out for multiple ligands that are immobilized one at a time (in series), or for multiple ligands co-immobilized simultaneously. In a preferred embodiment, the membrane is an ultrahigh molecular weight polyethylene having a hydrophilic coating, the ligand is covalently attached thereto via amide bonds. The hydrophilic coating is available under the trademark, ETCHGUARD® (Millipore Corp., U.S. Pat. No. 4,618,533).

The membrane/ligand compositions that are useful for carrying out the present invention will be apparent to those skilled in the art by the following examples each of which utilizes a composite membrane prepared according to U.S. Pat. No. 4,618,533 and containing carboxylic acid groups or sulfonic acid groups. One objective of the membrane or composite membrane itself is to filter out particulate material, if present, in the pH neutral solution. For this purpose, the membranes should have a microporous or ultraporous structure. Microporous pore sizes typically range from about 0.005 to about 10 microns. Ultraporous pore sizes are smaller than microporous pore sizes, typically ranging from about 0.0001 to about 0.005 microns. The ligands may be attached to the upstream outer surface of the membrane, the downstream outer surface of the membrane, the inner porous surface of the membrane or any combination of these surfaces. Preferably, the entire surface of the membrane, including the pores, contain ligands.

The following examples illustrate the present invention and are not intended to be limiting in any way. All references cited herein are incorporated by reference in their entirety.

EXAMPLES

Example 1

Multiple Ligand Immobilization in Series

This example illustrates sequentially immobilizing three ligands (SL 415, SL 420 and SL 407; IBC Advanced Technologies, Inc., American Fork, Utah) on one cartridge containing a pleated membrane of hydrophilic polyethylene (10,000 $cm^2$ surface area) (ETCHGUARD®; Millipore Corp.). An SL 415 ligand was first immobilized to the membrane. A cartridge was activated using 15 gms of EDAC dissolved in 1.2 liters of DI water for 15 minutes, followed by an additional 15 gms of EDAC in the same solution for 10 or more minutes. In the coupling step, the activated cartridge was then contacted with 59 gms of the SL 415 macrocycle ligand solution in one liter DI water. The coupling was effective with or without decanting the activation solution, the coupling reaction contact time can be several hours or up to an overnight duration. The cartridge was washed with DI water to prepare for the second ligand attachment. A membrane coupon was processed with the cartridge to determine the ligand capacity. The Fe capacity was 0.091 $\mu$mole/$cm^2$.

In the second step, ligand SL 407 (e.g., capable of removing nickel, cobalt, zinc and copper) was immobilized to the membrane. As in the above procedure, the cartridge now containing the ligand SL 415 was activated with EDAC (two steps, 15 gms EDAC in 1.2 liter DI water each and 15 mins. and 10 mins. activation time, respectively). The activated cartridge was then coupled using 20 gms of SL 407 in one liter DI water. The cartridge was washed with DI water to prepare it for the third ligand attachment. A membrane coupon was processed with the cartridge to determine the ligand capacity. The Na capacity was 0.3 $\mu$mole/$cm^2$.

The third ligand SL 420 was immobilized following the same procedures described above of activation and coupling. The activation medium was 1.2 liters of 75% IPA and 25% DI water. The SL 420 ligand was prepared by dissolving 30 gms of the ligand in one liter of 75% IPA (790 ml) and 25% DI water (210 ml). After the coupling reaction, the cartridge was washed with a mixture of 75% IPA (790 ml) and 25% DI water (210 ml). A membrane coupon was processed with the cartridge to determine the macrocycle ligand capacity. The Cu capacity measured was 0.034 $\mu$mole/$cm^2$.

Example 2

Multiple Ligands Co-immobilized Simultaneously

This example illustrates immobilizing three ligands (SL 415, SL 420 and SL 407; IBC Advanced Technologies, Inc.) on one cartridge containing a pleated membrane of hydrophilic polyethylene (10,000 $cm^2$ surface area) (ETCHGUARD®; Millipore Corp.). An SL 415 ligand was first immobilized to the membrane. A cartridge was activated using 15 gms of EDAC dissolved in 1.2 liters of DI water for 15 minutes, followed by additional 15 gms of EDAC in the same solution for 20 more minutes. In the coupling step, the activated cartridge is then contacted with 50 gms of the SL 415 macrocycle ligand solution in one liter DI water. The coupling was effective with or without decanting the activation solution, the coupling reaction contact time can be several hours or up to an overnight duration. The cartridge was washed with DI water to prepare for attaching two more ligands simultaneously. Two membrane coupons were processed with the cartridge to determine the ligand capacity. The Fe capacity measured was 0.0.15 and 0.22 $\mu$mole/$cm^2$.

In the second step, the ligands 407 and 420 were attached to the cartridge membrane in one step. The cartridge with the SL 415 ligand already attached was activated using 15 gms of EDAC dissolved in 1.2 liters of DI water for 15 minutes, followed by an additional 15 gms of EDAC in the same solution for 10 more minutes. In the coupling step, the activated cartridge was then contacted with a solution containing 20 gms of SL 407 and 30 gms of SL 420 dissolved in a mixture of 900 ml methanol and 400 ml DI water. The procedure also worked if methanol was substituted with isopropyl alcohol. Two membrane coupons were processed with the cartridge to determine the ligand capacity. The measured capacity for Na (SL 407) was 0.11 and 0.096 $\mu$mole/$cm^2$, and 0.35 and 0.29 $\mu$mole/$cm^2$ for Cu (SL 420).

Example 3

Purification of Water

Figure 2:
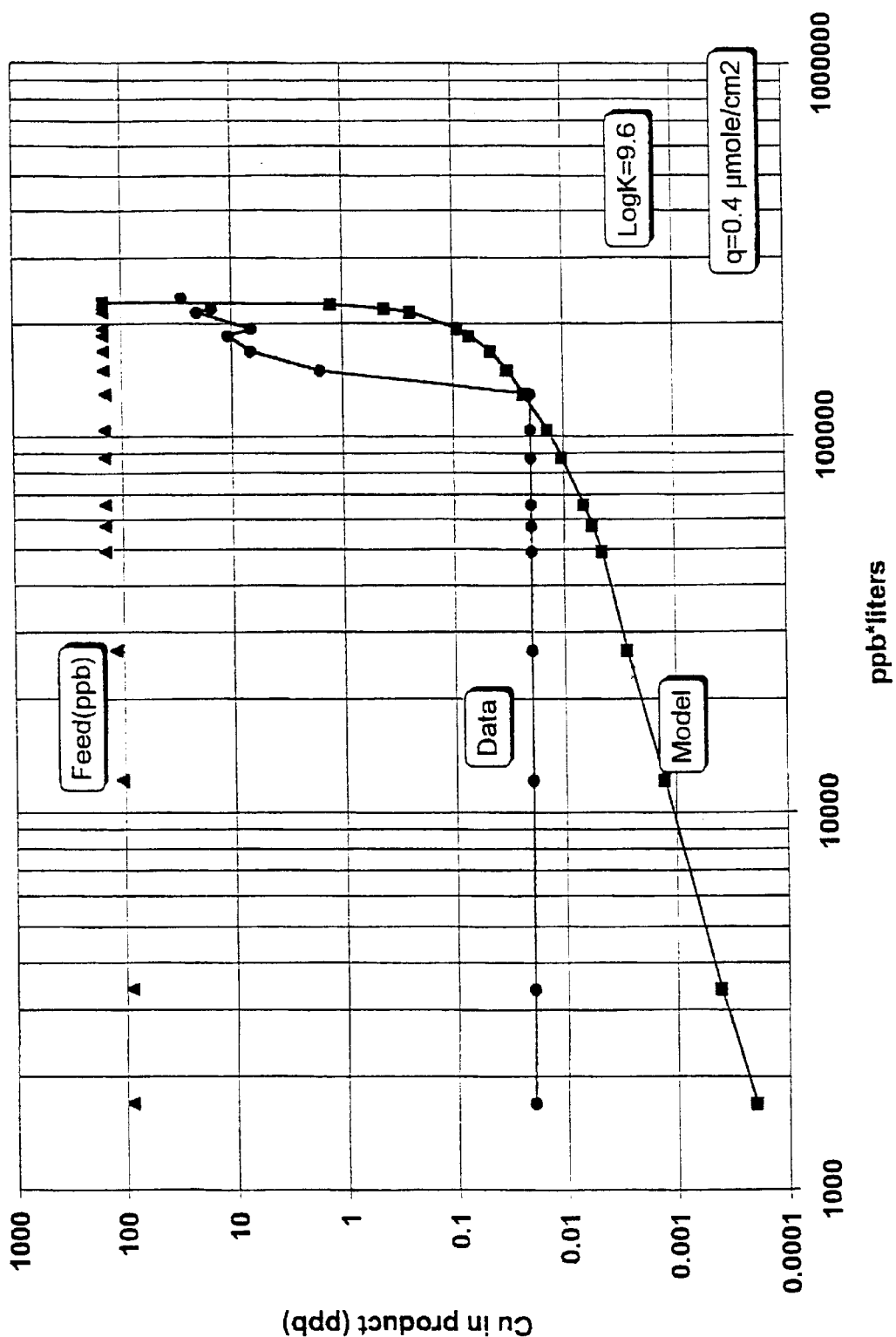
FIG. 2 is a graphic illustration of the effectiveness of a pleated cartridge device containing a copper immobilized ligand. Copper feed at 100 ppb (diamonds); data curve (circles); model curve (squares).

This example illustrates the use of a ligand membrane device of this invention to purify Cu containing water solutions in a one-pass flow mode. The solution flowed through a pleated cartridge device made with the Cu-ligand (SL 420)-immobilized-membrane (hydrophilic polyethylene). The device membrane area is about 10,000 $cm^2$ and the ligand capacity 0.4 $\mu$mol/$cm^2$ (SL 420). The incoming feed concentration was maintained at about 100 ppb Cu and the solution flow rate at 1 gpm. The purifier product (effluent) was monitored for Cu concentration to determine the breakthrough. The experimental results are plotted in FIG. 2 as the product Cu concentration (ppb) versus the total volume throughput (expressed as ppb* liters), a product of the total volume (liters) processed and the incoming feed concentration (ppb). The data show that the purifier removes the incoming feed Cu from 100–145 ppb levels (Feed curve in the figure) to less than detection levels (<0.02 ppb, Data curve) continuously until the breakthrough capacity is reached at about 130000 ppb* liters throughput. The performance is as predicted (Model curve) by the engineering design model (see below) developed to custom design chemical purifiers for specific applications and to predict their performance from knowing the process parameters such as liquid flow rate, incoming ion contamination, purifier size, and the macrocycle ligand membrane ion capacity. The breakthrough capacity and the tolerable effluent concentration for a given application typically govern a device lifetime.

Performance Model $$C_{cu} = \frac{VC_0(H^+)^2/A}{V(H^+)^2/A + Kq_0 - KVC_0/A}$$

Where:
$C_{cu}$=equilibrium copper concentration (mol/l)
V=volume (liters)
$C_o$=initial Cu concentration (mol/liter)
H+=hydrogen ion concentration (mol/l)
K=equilibrium binding constant (mol/l)
$q_o$=membrane capacity (mole/cm$^2$)
A=cartridge area (Cm$^2$)

Example 4

Device Cleaning

The membrane device was cleaned using 2–4 liters of 100% isopropyl alcohol (IPA) to remove organics, followed by a deionized (DI) water flush to remove IPA. The device was then cleaned with concentrated hydrochloric acid, HCl, 6 molar (e.g., for copper ligand) to 12 molar (e.g., for iron ligand) concentration. The device was static soaked in 1.2 liters of acid for 1–2 hours, followed by an additional 8 liters of acid flowed through the device at 30–50 ml/min flow rate. The device was drained to remove all acids. The device was then flushed with the ultrahigh purity deionized water to remove all traces of residual acid. This cleaning procedure was very effective in producing clean devices of extremely low extractables.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for simultaneously removing metallic ions and particulate material from a pH neutral solution, comprising contacting said solution with a composition suitable for simultaneously removing metallic ions and particulate material contained in said solution and recovering a purified and filtered solution essentially depleted of metallic ions and particulate material to sub-parts-per-billion concentrations; wherein the composition comprises a membrane ligand combination represented by the formula:

M-B-L wherein M is a membrane or composite membrane having a hydrophilic or partially hydrophilic surface and containing polar functional groups and having a pore size sufficient to filter particulate material contained in said solution;
L is a ligand having an affinity for metallic ions and containing a functional group reactive with an activated polar group from the membrane; and
B is a covalent linkage formed by the reaction between the activated polar group and the functional group of the ligand.

2. The method according to claim 1 wherein L is a ligand selected from the group consisting of amine-containing hydrocarbons; sulfur and nitrogen-containing hydrocarbons; sulfur-containing hydrocarbons; crowns and cryptands; aminoalkylphosphoric acid-containing hydrocarbons; proton-ionizable macrocycles; pyridine-containing hydrocarbons; polytetraalkylammonium and polytrialkylamine-containing hydrocarbons; thiol and/or thioetheraralkyl nitrogen-containing hydrocarbons; sulfur and electron withdrawing group-containing hydrocarbons; hydroxypyridinone; and oxygen donor macrocycles.

3. The method according to claim 2 wherein B is a covalent linkage selected from the group consisting of amide (NHCO), ester (COO), thioester (COS), carbonyl (CO), ether (O), thioether (S), sulfonate (SO$_3$), and sulfonamide (SO$_2$NH) linkages.

4. The method according to claim 3 wherein M is a membrane selected from the group consisting of polyamides and cellulosics.

5. The method according to claim 4 wherein said membrane is a polyamide comprising nylon.

6. The method according to claim 4 wherein said membrane is a cellulosic selected from the group consisting of cellulose, regenerated cellulose, cellulose acetate and nitrocellulose.

7. The method according to claim 3 wherein M is a composite membrane comprising a membrane substrate formed of a first polymer, said substrate being directly coated on its entire surface with a second polymer by a precipitated crystal technique and having a hydrophilic surface.

8. The method according to claim 7 wherein said first polymer is a polymer or copolymer of a member selected from the group consisting of fluorinated polymers, polyolefins, polystyrenes, polysulfones, polyesters, polyacrylates, polycarbonates, vinyl polymers and polyacrylonitriles.

9. The method according to claim 8 wherein said second polymer is a perfluorinated polyether.

10. The method according to claim 3 wherein M is a composite membrane comprising a membrane substrate formed of a first polymer, said substrate being directly coated on its entire surface with a cross-linked second polymer formed from a monomer polymerized in situ and cross-linked in situ on said substrate and having a hydrophilic surface.

11. The method according to claim 10 wherein said first polymer is a polymer or copolymer of a member selected from the group consisting of fluorinated polymers, polyolefins, polystyrenes, polysulfones, polyesters, polyacrylates, polycarbonates, vinyl polymers and polyacrylonitriles.

12. The method according to claim 11 wherein said second polymer is formed from a polymerizable monomer selected from the group consisting of acrylates, methacrylates, ethacrylates, acrylic acid, acrylamides, methacrylamides, ethacrylamides and mixtures thereof.

13. The method according to claim 12 wherein B is an amide linkage.

14. The method according to claim 3 wherein B is a sulfonamide linkage.

15. The method according to claim 1 wherein said composition is contained in a contacting device for holding said composition, wherein said contacting device includes means for flowing a source solution and a receiving solution past said composition.

16. The method according to claim 15 wherein said contacting device comprises a cartridge.

17. The method according to claim 1 wherein the purified and filtered solution has been essentially depleted of metallic ions and particulate material to parts-per-trillion concentrations.

18. The method according to claim 1, wherein the pH neutral solution is water or deionized water.

19. The method according to claim 1, wherein the pH neutral solution is a buffered aqueous solution.

20. A method for simultaneously removing metallic ions and particulate material from deionized water, comprising contacting said deionized water with a compositon suitable for simultaneously removing metallic ions and particulate material contained in said deionized water and recovering a purified and filtered solution essentially depleted of metallic ions and particulate material to sub-parts-per-billion concentrations; wherein the composition comprises a membrane ligand combination represented by the formula:

M-B-L wherein M is an ultrahigh molecular weight polyethylene having a hydrophilic surface and containing carboxyl or ester functional group and having a pore size sufficient to filter particulate material contained in said solution;

L is a ligand having an affinity for metallic ions and contaning a functional group reactive with a functional group from the membrane; and B is a covalent linkage formed by the reaction between the functinal group on M and the functional group of the ligand.

21. A system for simultaneous purification and filtration of metallic ions and particulate material from a pH neutral solution, comprising:

a device having a housing and a membrane ligand combination, contained within the housing, represented by the formula:

M-B-L wherein M is a membrane or composite membrane having a hydrophilic or partially hydrophilic surface and containing polar functional groups and having a pore size sufficient to filter particulate material contained in said solution, L is a ligand having an affinity for metallic ions and containing a functional group reactive with an activated polar group from the membrane, and B is a covalent linkage formed by the reaction between the activated polar group and the functional group of the ligand, wherein the membrane ligand combination is capable simultaneously of essentially depleting metallic ions and particulate material contained in the pH neutral solution to sub-parts-per-billion concentrations; and a recirculation system, for flow of the pH neutral solution though the membrane ligand combination, comprising a circulation pump, a conduit and a container for storage of purified and filtered water.

22. The system of claim 21, wherein the device is in the form of a cartridge.

23. The system of claim 22, wherein the membrane ligand combination is housed in the cartridge in a pleated configuration.

* * * * *